United States Patent
Yaniv et al.

(10) Patent No.: US 8,702,886 B2
(45) Date of Patent: Apr. 22, 2014

(54) PATTERNED ARTIFICIAL MARBLE SLAB

(75) Inventors: Moti Yaniv, Sdot-Yam (IL); Ruti Harel, Sdot-Yam (IL)

(73) Assignee: Caesarstone Sdot-Yam Ltd., Kibbutz Sdot Yam (IL)

( * ) Notice: Subject to any disclaimer, the term of this patent is extended or adjusted under 35 U.S.C. 154(b) by 239 days.

(21) Appl. No.: 12/736,299

(22) PCT Filed: Apr. 2, 2009

(86) PCT No.: PCT/IB2009/005136
§ 371 (c)(1),
(2), (4) Date: Jan. 18, 2011

(87) PCT Pub. No.: WO2009/122373
PCT Pub. Date: Oct. 8, 2009

(65) Prior Publication Data
US 2011/0104451 A1    May 5, 2011

Related U.S. Application Data

(60) Provisional application No. 61/064,913, filed on Apr. 3, 2008.

(51) Int. Cl.
*B24B 1/00* (2006.01)
(52) U.S. Cl.
USPC .............................. 156/153; 156/247; 451/29
(58) Field of Classification Search
USPC ....................... 451/29–31, 38–40, 59; 125/25; 156/153, 247
See application file for complete search history.

(56) References Cited

U.S. PATENT DOCUMENTS

| | | | | |
|---|---|---|---|---|
| 3,916,050 A | * | 10/1975 | Kurhajec | 428/40.5 |
| 4,443,500 A | | 4/1984 | De Jori | |
| 4,571,358 A | * | 2/1986 | Suh et al. | 428/155 |
| 5,197,234 A | * | 3/1993 | Gillenwater | 451/29 |
| 5,311,530 A | * | 5/1994 | Wagner et al. | 372/36 |
| 5,585,176 A | * | 12/1996 | Grab et al. | 428/336 |
| 5,629,132 A | | 5/1997 | Suzuki et al. | |
| 6,266,476 B1 | * | 7/2001 | Shie et al. | 385/147 |
| 6,811,469 B2 | * | 11/2004 | Yamamoto et al. | 451/41 |
| 2007/0003791 A1 | * | 1/2007 | Rochette | 428/703 |
| 2008/0032050 A1 | | 2/2008 | Yoon | |

FOREIGN PATENT DOCUMENTS

| | | |
|---|---|---|
| DE | 370 502 | 3/1923 |
| DE | 21 14 014 | 10/1972 |
| DE | 92 08 681 | 2/1993 |
| DE | 196 23 806 | 12/1996 |

(Continued)

OTHER PUBLICATIONS

Supplementary European Search Report for EP 09 72 6801 dated Apr. 18, 2011.

(Continued)

*Primary Examiner* — Scott W Dodds
(74) *Attorney, Agent, or Firm* — Eitan, Mehulal & Sadot

(57) ABSTRACT

According to some embodiments, there is provided a method of producing a patterned artificial marble slab (2, 5, 11, 16). The method includes adhering one or more patterned substances (1) to a surface of the artificial marble slab, processing said artificial marble slab and removing said one or more patterned substances from the surface of the artificial marble slab, thereby obtaining an elevated or recessed pattern (3, 4, 6, 7, 9) on the surface of the artificial marble, wherein the elevated or recessed pattern has essentially the form of the patterned substances.

15 Claims, 4 Drawing Sheets

(56) References Cited

FOREIGN PATENT DOCUMENTS

| | | |
|---|---|---|
| DE | 298 03 693 | 6/1998 |
| DE | 10 2004 049563 | 4/2006 |
| FR | 2 313 183 | 12/1976 |
| JP | 403122305 | 5/1991 |

OTHER PUBLICATIONS

International Search Report for application PCT/IB2009/051386 dated Sep. 28. 2009.

* cited by examiner

PATTERNED ARTIFICIAL MARBLE SLAB

PRIOR APPLICATIONS DATA

This application is a National Phase filing of, and claims benefit and priority from, PCT International Patent Application Number PCT/IB2009/051386, filed on Apr. 2, 2009, published on Oct. 8, 2009 as International Publication Number WO 2009/12233 A2, which is hereby incorporated by reference in its entirety; and which in turn claims benefit and priority from U.S. Provisional Patent Application No. 61/064,913, filed on Apr. 3, 2008, which is hereby incorporated by reference in its entirety.

BACKGROUND

As compared to natural stone compositions, such as granite and marble, composite stone material, such as quartz containing stone material is stronger and more durable. In addition, quartz containing stone material may be cleaner, safer and more consistent than other stone surfaces. Furthermore, quartz containing stone materials may be more resistant to: breakage, scratching, stain, heat, chemicals, freeze-thaw damage and the like.

Composite stone material, such as for example, artificial marble, engineered stone and quartz surfaces, may be found in various settings and may be used for various purposes, such as, for example: Interior wall cladding, fireplace mantles and surroundings, wainscots and wall bases, bank teller lines, table and desktops, elevator cab walls and floors, floor tile and stair treads, food service areas, shower and tub surrounds, toilet compartment partitions, window seats, countertops and backlashes.

In order to provide the composite stone material with additional desired properties, various additives may be used. The additives may be added before, during and/or after the preparation process of the composite stone material, and may be used to fine-tune the properties of the composite stone for its intended used.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other advantages or improvements.

According to some embodiments there is provided a patterned artificial marble/engineered stone/quartz surfaces slab that includes an elevated and/or recessed pattern on its surface. The pattern may include any geometrical shape, non-geometrical shapes, characters, letters, digits, and the like. The pattern may include more than one type of pattern and may be repeated one or more times. The pattern(s) may be distributed evenly or randomly over the surface of the slab. The patterns may be elevated and/or recessed relatively to the surface of the slab and may be visually and texturally distinguished from other regions of the surface of the slab. The patterns may include one or more colors and may be at any thickness in the range of, for example, 1 micron to 5 millimeters.

According to further embodiments, the patterns on the artificial marble/engineered stone/quartz surfaces slab may be used to identify the slab, may be used as directing means, may function as anti-slip means, and the like.

According to some embodiments, there is further provided a method of producing patterned artificial marble/engineered stone/quartz surfaces slab. The method includes adhering to a slab (that may be hardened, partially hardened or not hardened) one or more patterned substances that are used as a protecting mask of the slab. The slab is then processed (polished, brushed or any other processing method) by mechanical and/or chemical means to a desired level. After polishing/brushing the slab, the substance is removed from the slab, which may be further processed by re-polishing re-brushing or any other re-processing method or may be cleaned and applied any desired finish.

According to some embodiments, there is provided a method of producing a patterned artificial marble slab that includes adhering one or more patterned substances to a surface of the artificial marble slab; processing the artificial marble slab; and removing said one or more patterned substances from the surface of the artificial marble slab, thereby obtaining a pattern on the surface of the artificial marble, wherein the pattern has essentially the form of the patterned substances and wherein the pattern is elevated or recessed.

According to further embodiments, the patterned artificial marble may include one or more patterns on the surface of the artificial marble. The patterns may include geometrical shapes, non-geometrical shapes, characters, digits, letters, or any combination thereof.

According to additional embodiments, the processing may include polishing, brushing, scratching, blasting, buffing, etching, lapping, ablating, grinding or any combination thereof. The processing may include mechanical processing, chemical processing, or both. The mechanical processing may include such means as brushes, polishing rocks, laser, sand-blasting, or any combination thereof. The chemical polishing may include such means as using an abrasive chemical.

According to additional embodiments, the processing of the artificial marble may include processing to a depth of 1 micron to 5 millimeters.

According to some embodiments, there is provided a patterned artificial marble slab that includes one or more elevated or recessed patterns on the surface of the artificial marble wherein the patterned artificial marble is manufactured by adhering one or more patterned substances to a surface of the artificial marble slab, processing said artificial marble slab and removing said one or more patterned substances from the surface of the artificial marble slab, thereby obtaining a patterned artificial marble slab comprising one or more elevated or recessed patterns on the surface of the artificial marble essentially in the form of the patterned substances.

According to additional embodiments, the one or more patterns may be distributed evenly over the surface of the artificial marble. The one or more patterns may be distributed randomly over the surface of the artificial marble. The one or more patterns may include identical patterns. The one or more patterns may include different patterns. The one or more patterns may include a colored pattern, the color of which is different from the color of the surface of the artificial marble. The one or more patterns may include a colored pattern that includes more than one color. The one or more patterns may include varying thickness along the pattern, wherein the thickness may be in the range of, for example, about 1 micron to 5 millimeters.

According to additional embodiments the one or more patterns may be distinguishable from the surface of the patterned artificial marble, wherein said distinguishable includes visually distinguishable, texturally distinguishable, or both.

According to additional embodiments, the top surface of the artificial marble is a top surface of said artificial marble.

In addition to the exemplary aspects and embodiments described above, further aspects and embodiments will become apparent by reference to the figures and by study of the following detailed descriptions.

BRIEF DESCRIPTION OF THE FIGURES

Examples illustrative of embodiments are described below with reference to figures attached hereto. In the figures, identical structures, elements or parts that appear in more than one figure are generally labeled with a same numeral in all the figures in which they appear. Dimensions of components and features shown in the figures are generally chosen for convenience and clarity of presentation and are not necessarily shown to scale. The figures are listed below.

DETAILED DESCRIPTION

Figure 1:
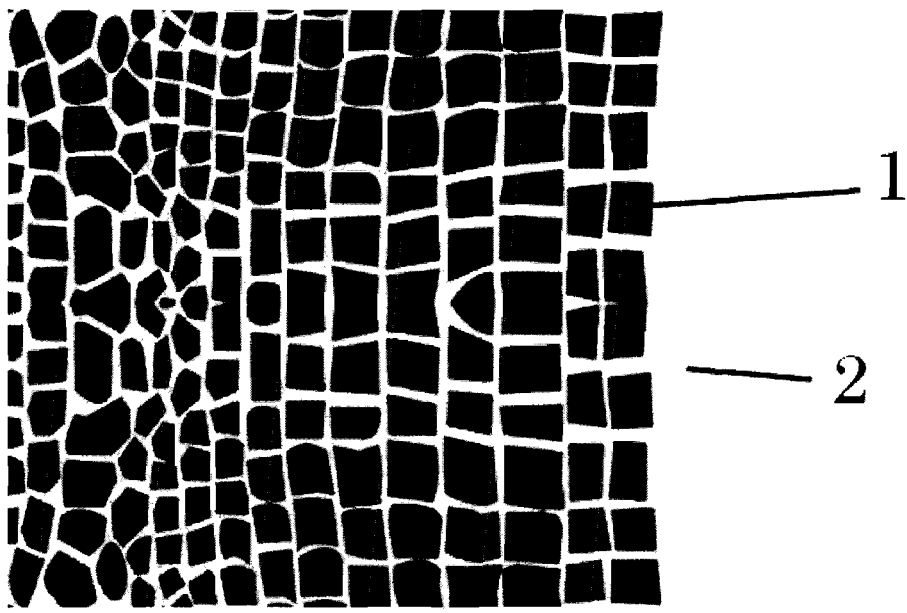
FIG. 1—top view of a region of a surface area of a slab, with a mask with a desired pattern attached to the top surface according to some embodiments.

In the following description, various aspects of the disclosure will be described. For the purpose of explanation, specific configurations and details are set forth in order to provide a thorough understanding of the disclosure. However, it will also be apparent to one skilled in the art that the embodiments may be practiced without specific details being presented herein. Furthermore, well-known features may be omitted or simplified in order not to obscure the embodiments.

As referred to herein, the terms "composite stone", "composite stone material", "slab", "artificial marble", "engineered stone" and "quartz surfaces" may interchangeably be used. Thus, when referencing any of the terms "composite stone", "composite stone material", "slab", "artificial marble", "engineered stone" and "quartz surfaces", it implies that all the terms are covered. For example, when referencing the term "composite stone", the terms "composite stone material", "slab", "artificial marble", "engineered stone" and "quartz surfaces" are also covered.

As referred to herein, the terms "patterned composite stone", "patterned composite stone material", "patterned slab", "patterned artificial marble", "patterned engineered stone" and "patterned quartz surface" may interchangeably be used.

A composite stone material, such as, for example, artificial marble/engineered stone/quartz surfaces, may be composed of various materials. For example, a composite stone material may be composed mainly of organic polymer(s) and inorganic particulate component. The inorganic particulate component may include such components as silicon, basalt, glass, diamond, rocks, pebbles, shells, a variety of quartz containing materials, such as, for example, but not limited to: crushed quartz, sand, quartz particles, and the like, or any combination thereof. For example, the inorganic quartz material may include sand at various particle sizes and at different combinations. Linkage between the organic and inorganic compounds may be carried out and/or facilitated by using binder molecules, such as, for example, mono-functional or multi-functional silane molecules, dendrimeric molecules, and the like, that may have the ability to bind the organic and inorganic components of the composite stone. The binders may further include mixture of various components, such as initiators, hardeners, catalysts, binding molecules and bridges, or any combination thereof. The manufacturing process of the composite stone material may include blending of raw material (such as inorganic quartz and organic polymers, unsaturated polymers, and the like, such as polyester) at various ratios. For example, the composite stone material may include about 8-95% natural quartz aggregates to about 5-15% polymer resins. For example, the composite stone material may include about 93% natural quartz aggregates and about 7% polymer resins. In addition, any desired amounts of various additives may be added to blending of raw materials, at various stages of production. For example, such additives may include, colorants, dyes, pigments, chemical reagents, antimicrobial substances, fungicidal agents, and the like or any combination thereof. As a result of adding various additives to the blending of raw materials, the additives may be present in the final composite stone product and may further change various characteristics of the composite stone. Such characteristics may include, for example, physical properties, such as: color, texture, display pattern, and the like; chemical properties, such as, for example, chemical resistance, pH properties, and the like; biological properties, such as, for example, antibacterial properties, antimicrobial properties, fungicidal properties, and the like; and mechanical properties, such as, for example, strength, scratch resistance, impact resistance, and the like. The resulting mixture may later be poured to a support or a temporary support, such as rubber, paper, plastic or any other polymeric material, water soluble paper, silicon sheet or the like with or without a support frame or a shaping frame, a mold such as a rubber tray mold or any other appropriate support. The mixture is poured substantially in the form of a desired slab (for example, at a size of 306 cm×144 cm with or without wall shaping). The mixture may then be compacted by a special vacuum and vibration process such as vibrocompaction at high pressure such as about 100 Tons. Then, the compressed mixture may be placed in a curing and/or hardening kiln, for example, at a temperature in the range of 80° C. to 115° C. for 30 to 60 minutes until it hardens and assumes natural stone properties, but with greater performance and higher resistance to stains and impact. After completion of the casting process, the slabs may be flattened, gauged, calibrated and polished to a high and enduring shine or any desired finish to be used at various settings, such as, for example, interior wall cladding, fireplace mantles and surroundings, wainscots and wall bases, bank teller lines, table and desktops, elevator cab walls and floors, floor tile and stair treads, food service areas, shower and tub surrounds, toilet compartment partitions, window seats and countertops.

According to some embodiments, as mentioned above herein, after completion of the casting process (after, during and/or before the hardening process), the slabs may be further processed, so as to obtain a desired finish that may include, among others, various patterns at the surface of the slab. The patterns may include any type of pattern, such as geometrical shapes, non-geometrical shapes, characters, letters, numbers, and the like, or any combination thereof. The pattern may be elevated/projected/protruded/recessed relatively to the surface of the slab. For example, the pattern may have a thickness (height or depth) of 1 micron to 5 millimeters. The thickness of the pattern also determines the level of projection (height/ elevation) or recession (depth) of the pattern relatively to the surface of the slab. The pattern may have homogenous thickness or may have various thicknesses along various regions of the pattern. The color of the pattern may be identical or different from the color of the surface of the slab. Moreover, the pattern may include more than one color. In addition, on the surface of the slab any combination of patterns may exist (referred to herein as patterning). The patterning may be homogenous or heterogeneous. By homogenous patterning, the meaning is that all the patterns on the surface of the slab are identical in size and shape. By heterogeneous patterning, the meaning is that the patterning may include a combination of patterns that are not identical to each other in shape and/or size. In both homogenous and heterogeneous patterning the distribution of the patterns on the surface of the slab may be even throughout the surface of the slab or may be random. Likewise the density of the patterns on the slab, which may be equal over various areas of the surface of the slab, or may be different over various areas of the surface of the slab.

The use of such patterns on the slab may serve several purposes, in addition to being decorative, for example, the patterns may be used as indicators of the slab. For example, the patterns may include logo, text, and the like that may be used as indicators of the manufacturer of the slab, model number of the slab, and the like. The patterns may be used, for example, in slabs that are to be used as guiding signs. According to additional examples, the patterns may be used as a mechanical means to prevent, for example, slippage, when the slab is used in slippery areas, such as, for example, sidewalks, bath, bathrooms, and the like.

Figure 2:
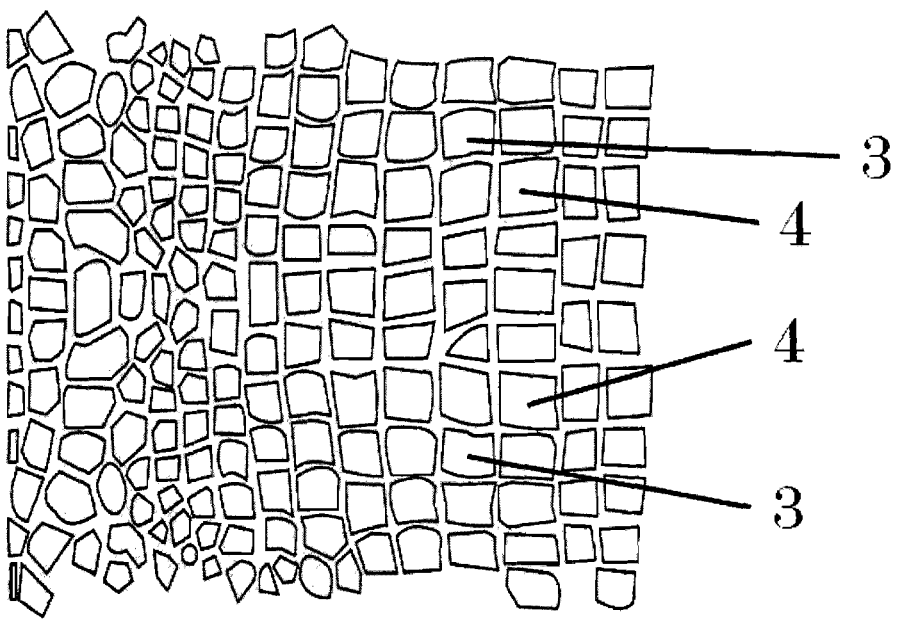
FIG. 2—top view of a region of a surface area of a patterned slab, according to some embodiments.
Figure 4:
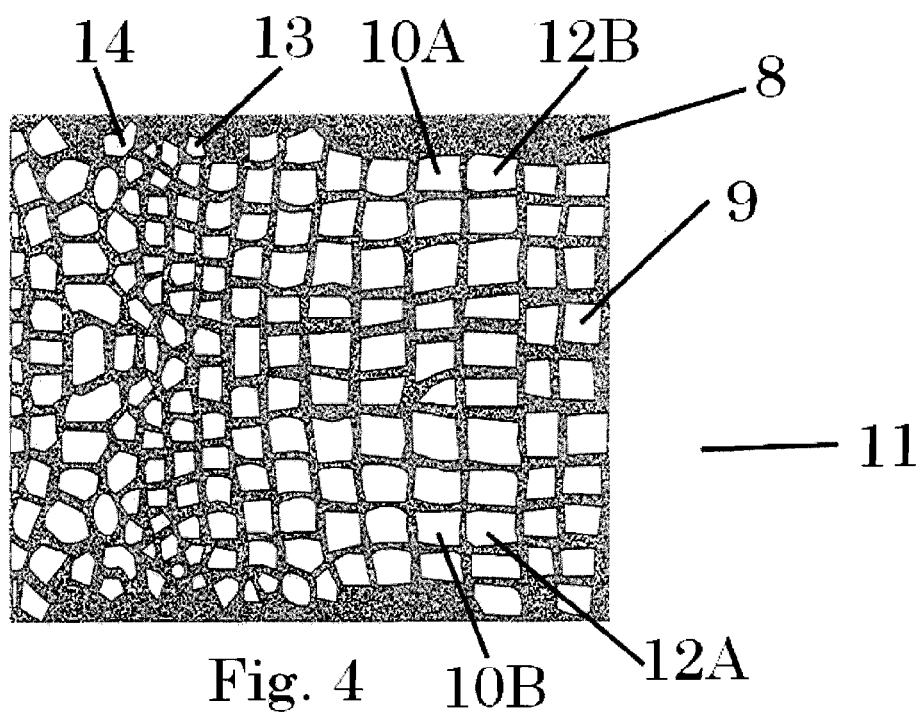
FIG. 4—top view of a region of a surface area of a patterned slab, according to some embodiments after processing. The processed (e.g. brushed) area may be the area between the white patches or vice versa.
Figure 5:
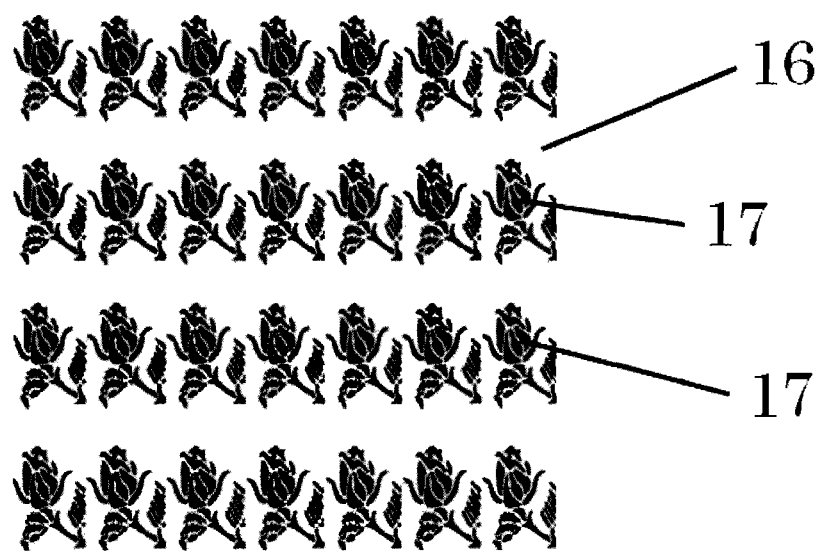
FIG. 5—top view of a region of a surface area of a patterned slab, according to some embodiments after processing. The processed (e.g. brushed) area may be the area between the white patches or vice versa.

According to some embodiments there is thus provided an artificial marble/engineered stone/quartz surface slab that includes a pattern on its surface (patterned artificial marble). Reference is now made to FIG. 1, which illustrates a top view of a mask 1 on a region of a surface area of a patterned slab 2. As shown in FIG. 2, on the surface of slab a pattern of elements 3 and 4 is produced. The pattern may be repeated any number of times (shown as one repeat in FIG. 2). In FIG. 1, the pattern of mask 1 is elevated in relation to the surface of the slab 2. The resulting pattern of elements 3 and 4 is thus visually (and texturally) distinguished from the surface of slab 2. As shown in FIG. 4, on the surface of a slab 11, a pattern 9 is located. Pattern 9 is easily distinguished (both visually and texturally) from other surrounding regions of the surface of slab 11. Pattern 9 may be repeated any number of times (as shown in FIG. 5).

Figure 3:
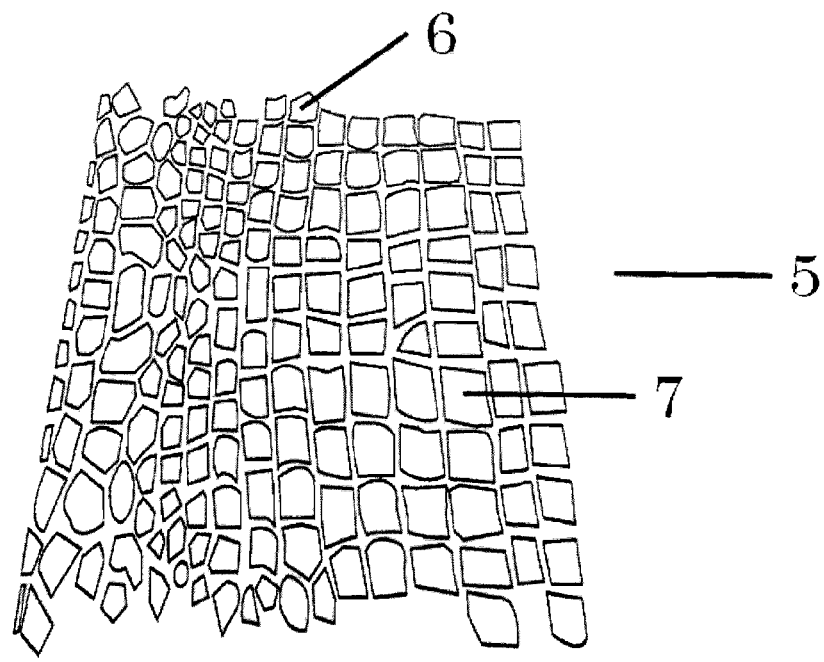
FIG. 3—perspective top view of a region of a surface area of a patterned slab, according to some embodiments.

Reference is now made to FIG. 3, which illustrates a perspective top view of a region of a surface area of a patterned slab. As shown in FIG. 3, a patterned slab 5 includes two distinct patterns: pattern 6 and pattern 7. The two patterns are distinct from each other in both size and shape. Both patterns are distinguishable visually and texturally from non-patterned regions of slab 5.

Reference is now made to FIG. 4, which illustrates a perspective top view of a region of a surface area of a patterned slab. As shown in FIG. 4, patterned slab 11 includes two distinct patterns that are repetitive over the surface of the slab. For example, as shown in FIG. 4, pattern elements 10A and 10B are similar in size and shape. Likewise, pattern elements 12A and 12B are similar in size and shape. However, pattern elements 13 and 14 are different in size and shape from pattern elements 10A and 10B. As shown in FIG. 4, the various patterns (such as elements 10A, 10B, 13, 14) are evenly distributed over the surface of slab 11. As further demonstrated in FIG. 3, the patterns are distinguishable both visually and texturally from non-patterned regions of slab 11.

The brushed area 8 of slab 11 may be used, for example, as an anti-slip surface.

Reference is now made to FIG. 5, which illustrates a top view of a region of a surface area of a patterned slab 16. As shown in FIG. 5, the patterned slab includes patterns 17 that are repetitive over the surface of the slab 16. Further demonstrated in FIG. 5, the patterns are distinguishable both visually and texturally from non-patterned regions of slab 16.

As performed today, creating patterns on a slab involves an expensive process that includes such methods as sand-spraying, laser engraving, use of abrasive chemicals (such as, for example, fluoric acid), and the like that are used to engrave a pattern on the surface of the slab. However, these methods have several disadvantages, in addition to being expensive, such as, for example: the methods may impose health hazards, such as, for example, when sand spraying, a silicosis disease may occur. In addition, the methods require additional equipment that is not part of the equipment of the producing line of the slabs. Therefore, in order to practice those methods, the slab must be removed from the slab production line and processed separately. When practicing those methods, the slab is sometimes bruised (slashed) and reprocessing of the slab is often needed. For example, reprocessing may include the use of sealers, UV-cross-linking, an additional polish step, and the like. The additional reprocessing steps, apart from being expensive also raise toxicity issues that are involved with these processes. Therefore, there is a need for a method of producing patterned slabs that overcome at least some of the disadvantages of the existing methods. The method disclosed herein may be part of the producing line of the slab, requires no additional expensive equipment, is not expensive and does not impose health hazards.

According to some embodiments, there is thus provided a method of patterning an artificial marble slab. The method includes the use of a specialized substance that may include such substances as adhesive tape, adhesive tag, plaster, sticker and the like that may be adhered/taped/placed/attached to the surface of the slab. The substance may include any type of material that may function as a masking substance on the surface of the slab. The substance may include, for example, any type of polymer, plastic, metal, mesh, any curable or hardened substance that may be coated, sprayed, painted or applied by any other means and subsequently be removed prior to finalizing the product. For example, the substance may include a mask of a color or glue or resin that may be removed from the surface of the slab. Preferably, the substance is patterned in a desired pattern. The substance may be adhered to the surface of the slab. Adhering the substance to the slab may be performed automatically in the production line of the slab, and/or manually. The substance may be transparent and adhered to the slab using an adhesive that may be broken down by UV radiation. The slab may include any type of slab, at various stages of production. For example, the slab may be hardened, partially hardened and/or not hardened at all. For example, the slab may include a smooth surface slab, a polished surface slab, a shined surface slab, a rough surfaced slab, and the like. After the adhering of the substance to the surface of the slab, the slab may be processed by any desired method, as detailed below. For example, the slab may be processed such that the slab is polished and/or brushed and/or scratched and/or ground and/or buffed and/or etched throughout the surface of the slab, apart from the areas that are physically protected/masked by the patterned substance.

Adhering the substance to the surface of the slab may include the use of any number of substances (this will determine the density of the patterns and number of patterns on a surface area of a slab). In addition, more than one kind of patterned substance may be adhered to the surface of the slab (this will determine the appearance of the patterned slab). Processing of the slab may include mechanical processing, chemical processing, and the like. For example, mechanical processing may include polishing, brushing, grinding, (sand-) blasting, buffing, etching, lapping, ablation, and the like, and may include the use of polish brushes, polish rocks, diamond pad, sand-buffing, laser, use of electric means, and the like, or any combination thereof, or any other applicable method known in the art or to be developed in the future. For example, the brush may include polishing/grinding brush at various mesh/ grain size. The mesh size may be used to dictate the level, smoothness and gloss of the grinding/brushing/polishing. In general, the larger the mesh is, the more grinding/brushing/ polishing particles (such as diamond heads) reside in the brush head and hence the brushing/grinding/polishing is finer. Chemical processing may include, for example, the use of abrasive chemical that may be used to polish the surface of the slab, the use of thermal means, and the like. Processing (such as, for example, brushing/polishing) of the slab may be performed homogenously on the surface of the slab such that the slab is processed (brushed/polished) to an equal extent along the surface area of the slab. In addition, or alternatively, processing (brushing/polishing) of the slab may be performed heterogeneously such that the slab surface is not processed (brushed/polished) to the same extent. This may be performed, for example, by performing gradual processing (brushing/polishing), wherein varying levels of processing (such as polishing/brushing) are performed. When performing heterogeneous processing (brushing/polishing), the pattern thus obtained may have varying thickness at various areas of the pattern. After the slab is processed (brushed/ polished), the substance may be removed from the surface of the slab. Removing of the substance may be performed automatically, manually, or both. For example, removing of the substance may be performed on the production line, while the slab is moving from the processing (polishing/brushing) station to the next station. Removal of the substance may be performed by any method, such as, for example, mechanical methods such as scraping, detaching, and the like. Removal of the substance may be performed by chemical methods, such as, for example, by use of solvents, mildly abrasive chemical, and the like. The substance may be removed by using UV-radiation to break-down the adhesive properties of the glue holding the substance to the slab. Upon removal of the substance, the patterned slab may be removed from the production line or may further be processed. Further processing of the slab may include the application of any type of finish to the slab. In addition, further processing may include re-processing (polishing/brushing) of the slab. The slab to be used in the method may include any type of slab, such as, for example, a single layer slab, a double layer slab, a multi-layer slab, or any combination thereof. The pattern thus obtained may be manually created, artistically computed, random, random-like systematic (repetitive), and the like, or any combination thereof.

Figure 6:
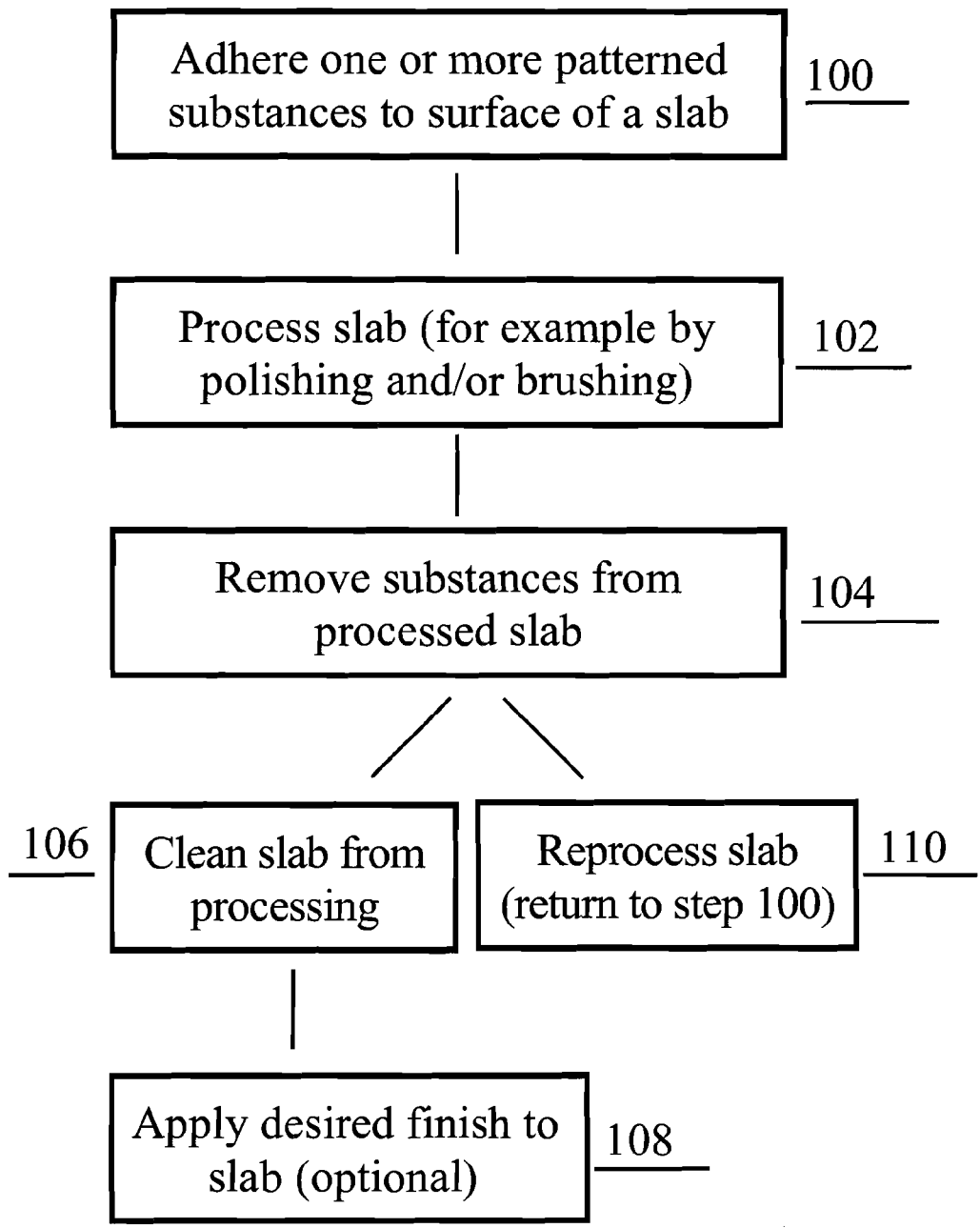
FIG. 6—a flow chart of a method of producing patterned slabs, according to some embodiments.

Reference is now made to FIG. 6, which illustrates a method of producing a patterned artificial marble/engineered stone/quartz surfaces slab, according to some embodiments. As shown in FIG. 6, in step 100, to the surface of a hardened slab (at any stage of finishing—from rough to essentially completely polished) one or more patterned substance(s) is adhered. At the next step, step 102, the slab is processed (for example, polished/brushed) by mechanical and/or chemical means. After processing (for example, by polishing/brushing) is completed, at step 104, the substance is removed from the surface of the slab. Next, the slab may be cleaned from the processing (such polishing/brushing) process at step 106, or optionally, the slab may be processed again at step 110, for example, by returning to step 100. After cleaning the slab at step 106, the slab may optionally be treated by application of any type of desired finish (step 108), such as, for example, a shining finish.

While a number of exemplary aspects and embodiments have been discussed above, those of skill in the art will recognize certain modifications, permutations, additions and sub-combinations thereof. It is therefore intended that the following appended claims and claims hereafter introduced be interpreted to include all such modifications, permutations, additions and sub-combinations as are within their true spirit and scope.

EXAMPLES

Example 1

Preparation of a patterned artificial marble (engineered stone/quartz surface) slab, wherein the patterned surface of the slab has a substantially non-smooth (grained) finish, as illustrated, for example in FIG. 4.
1. A substance in a desired pattern is attached (for example by adhering) to the top surface of an artificial marble slab.
2. The artificial marble slab is then processed by polishing/ brushing/grinding of the slab by using brushes at varying mesh sizes. The slab is processed by successively larger Mesh brushes (which thus exhibit finer grinding ability). In the example, the slab is successively brushed/ polished/grinded by diamond grinding brushes of the following grain sizes: 36-46-60-180-240-500-1000/ 1200-3000.
3. Upon completion of the processing of the artificial marble slab, the patterned substance is removed (for example, by peeling) from the surface of the slab.
4. The slab is further cleaned from the debris and leftovers of the brushing/grinding/polishing process.

Example 2

Preparation of a patterned artificial marble (engineered stone/quartz surface) slab, wherein the patterned surface of the slab has a substantially non-smooth (grained) finish, as illustrated, for example in FIG. 4.
1. A polymeric (e.g. PVC) film, with adhesive on one side, in a desired pattern is attached to the top surface of an artificial marble slab.
2. The artificial marble slab is then processed by brushing. This may be a dry or wet process, using abrasives brushes at varying mesh sizes. The slab is processed by successively larger Mesh brushes (which thus exhibit finer grinding ability). In the example, the slab is successively brushed by diamond grinding brushes of the following grain sizes: 36-46-60-180-240-500-1000/ 1200-3000 in a wet process.
3. Upon completion of the processing of the artificial marble slab, the patterned substance is removed by scraping it from the surface of the slab.
4. The slab is further cleaned from the debris and leftovers of the process.

Example 3

Preparation of a patterned artificial marble (engineered stone/quartz surface) slab, wherein the patterned surface of the slab has a substantially non-smooth (grained) finish, as illustrated, for example in FIG. 4.

1. A polymeric (e.g. PVC) film, with adhesive on one side, in a desired pattern is attached to the top surface of an artificial marble slab.
2. The artificial marble slab is then processed by sand blasting the surface.
3. Finishing will be done by brushing, in a dry or wet process, using abrasives brushes at varying mesh sizes. The slab is processed by successively larger Mesh brushes (which thus exhibit finer grinding ability). In the example, the slab is successively brushed by diamond grinding brushes of the following grain sizes: 36-46-60-180-240-500-1000/1200-3000.
3. Upon completion of the processing of the artificial marble slab, the patterned substance is removed by scraping from the surface of the slab.
4. The slab is further cleaned from the debris and leftovers of the process.

What we claim is:

1. A method of producing a patterned artificial marble slab comprising:
    adhering one or more patterned substances to a surface of the artificial marble slab prior to placing said artificial marble slab into a brushing machine also used for producing non-patterned artificial marble slabs;
    brushing said artificial marble slab in said brushing machine while said one or more patterned substances are adhered thereto, wherein the brushing comprises a polishing operation that produces a pattern on said surface of the artificial marble slab; and
    after said brushing, removing said one or more patterned substances from the surface of the artificial marble slab,
    wherein the pattern is elevated or recessed in a form corresponding to the patterned substances, and wherein the pattern is produced by said brushing in at least one region of the artificial marble slab.

2. The method of claim 1, wherein said pattern comprises geometrical shapes, non-geometrical shapes, characters, digits, letters, or any combination thereof.

3. The method of claim 1, further comprising:
    processing the artificial marble slab by performing at least one of: polishing, scratching, blasting, buffing, etching, lapping, ablating, grinding or any combination thereof.

4. The method of claim 3, wherein said processing comprises blasting.

5. The method of claim 3, wherein said processing comprises mechanical polishing, chemical polishing, or both.

6. The method of claim 5, wherein said mechanical polishing comprises polishing using brushes, polishing rocks, laser, sand-blasting, or any combination thereof.

7. The method of claim 5, wherein said chemical polishing comprises polishing using an abrasive chemical.

8. The method of claim 3, wherein processing the artificial marble comprises processing to a depth between 1 micron and 5 millimeters.

9. The method of claim 1, wherein the brushing comprises:
    brushing said artificial marble slab while said one or more patterned substances are adhered thereto by using diamond-grinding mesh brushes.

10. The method of claim 1, wherein the brushing comprises:
    brushing said artificial marble slab while said one or more patterned substances are adhered thereto by using at least two successively larger diamond-grinding mesh brushes having successively finer grinding ability.

11. The method of claim 1, wherein the brushing comprises a wet brushing process.

12. The method of claim 1, wherein the brushing comprises a dry brushing process.

13. The method of claim 1, wherein the brushing comprises brushing with a combination of wet brushing and dry brushing.

14. The method of claim 1, wherein the brushing comprises brushing with abrasive brushes.

15. The method of claim 1, wherein the brushing comprises brushing with abrasive brushes at varying mesh sizes.

* * * * *